US007027706B2

(12) United States Patent
Diaz et al.

(10) Patent No.: US 7,027,706 B2
(45) Date of Patent: Apr. 11, 2006

(54) SYSTEMS, APPARATUSES, AND METHODS FOR MANAGING CABLES WITH MINIMUM BEND RADIUS

(75) Inventors: Randall J. Diaz, Gilroy, CA (US); Kent Shum, Cupertino, CA (US); Dennis G. Vaillancourt, Laguna Niguel, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/745,013

(22) Filed: Dec. 23, 2003

(65) Prior Publication Data
US 2005/0135767 A1 Jun. 23, 2005

(51) Int. Cl.
*G02B 6/00* (2006.01)

(52) U.S. Cl. .................................................... 385/135
(58) Field of Classification Search ......... 385/130–138
See application file for complete search history.

(56) References Cited

U.S. PATENT DOCUMENTS

| 5,052,777 | A | * | 10/1991 | Ninnis et al. ................. 385/19 |
| 5,119,459 | A | * | 6/1992 | Meyerhoefer et al. ...... 385/135 |
| 5,511,144 | A | * | 4/1996 | Hawkins et al. ............ 385/135 |
| 5,647,045 | A | * | 7/1997 | Robinson et al. ........... 385/135 |
| 5,689,606 | A | * | 11/1997 | Hassan ........................ 385/135 |
| 5,715,348 | A | * | 2/1998 | Falkenberg et al. ......... 385/135 |
| 5,764,843 | A | * | 6/1998 | Macken et al. ............. 385/135 |
| 6,201,920 | B1 | * | 3/2001 | Noble et al. ................ 385/134 |
| 6,427,045 | B1 | * | 7/2002 | Matthes et al. ............. 385/135 |
| 6,515,227 | B1 | * | 2/2003 | Massey et al. ................ 174/50 |
| 6,556,763 | B1 | * | 4/2003 | Puetz et al. ................. 385/135 |
| 6,678,455 | B1 | * | 1/2004 | Knight ........................ 385/134 |
| 6,715,619 | B1 | * | 4/2004 | Kim et al. ..................... 211/26 |
| 6,721,484 | B1 | * | 4/2004 | Blankenship et al. ....... 385/135 |
| 2004/0175089 | A1 | * | 9/2004 | Dagley et al. .............. 385/135 |

* cited by examiner

Primary Examiner—Chandrika Prasad

(57) ABSTRACT

A cable management system is disclosed including a frame that can be attached to an equipment rack. Cable guides can be mounted on the frame to align a plurality of cables adjacent to each other. A cable tray is positioned adjacent the cable guides. The combination of the frame, the cable guides, and the cable tray can be positioned alongside a component in the equipment rack to route the cables around an outer edge of the component.

33 Claims, 5 Drawing Sheets

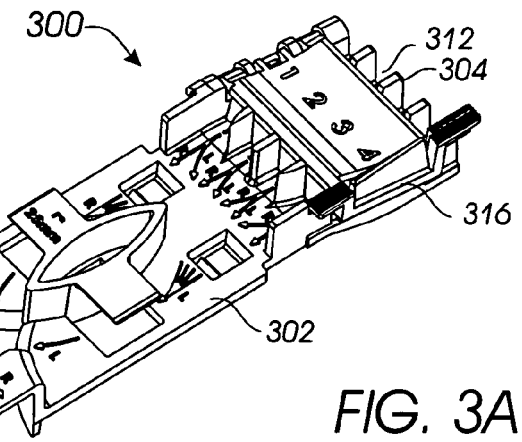
FIG. 3A
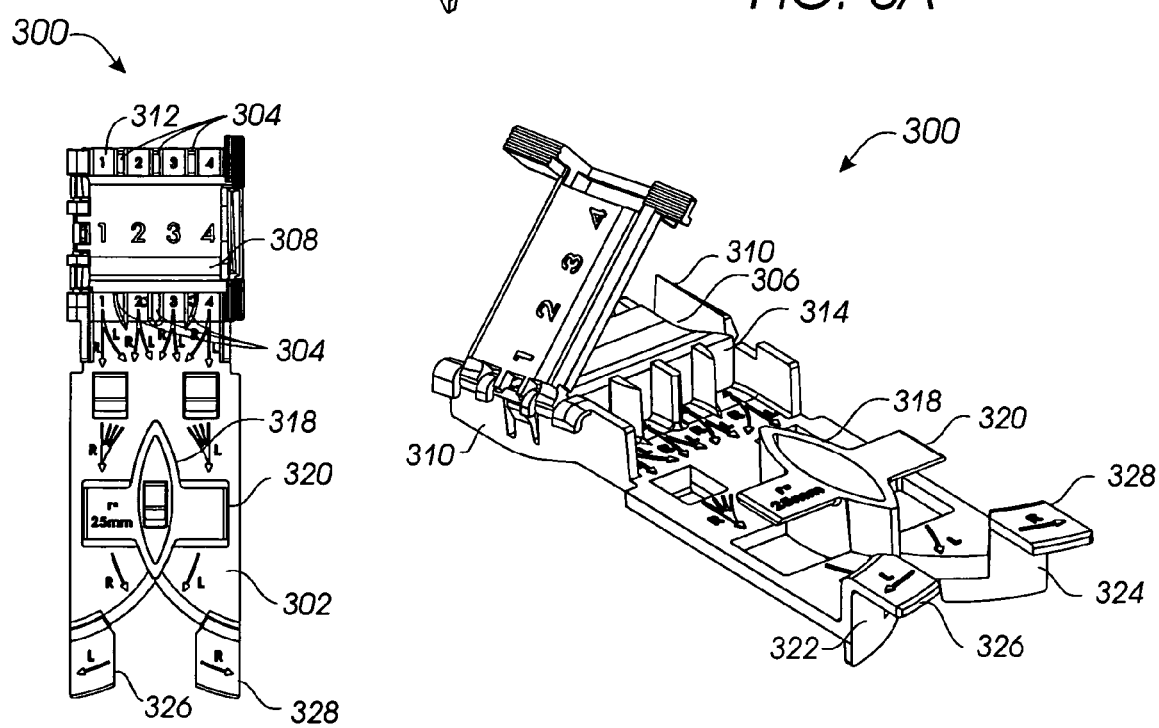
FIG. 3B
FIG. 3C
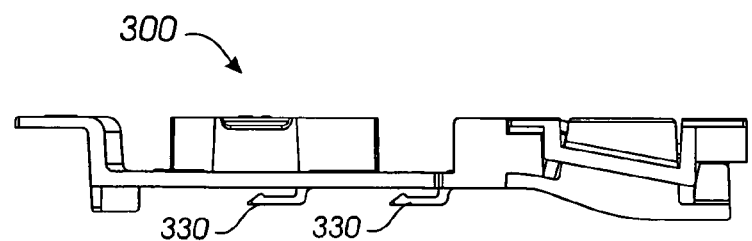
FIG. 3D

SYSTEMS, APPARATUSES, AND METHODS FOR MANAGING CABLES WITH MINIMUM BEND RADIUS

BACKGROUND

Ever-increasing demands for processing power from users of information networks has resulted in the development of high density racks filled with computer modules in centralized locations. The usability of such rack-mounted configurations is inhibited by the need for extensive cable connections to the computer modules, which are difficult to organize in a usable manner. Accordingly, cables have traditionally been left unorganized, resulting in a mass of tangled cables that inhibit removing, installing, and servicing individual components. As a result, cables must typically be disconnected from one or more computer modules in a rack, thereby decreasing the availability and efficient use of computer resources, as well as complicating network administration to re-allocate tasks performed by the modules to other systems.

Other problems arise when a rack of components is scaled or reconfigured and a module is exchanged for another module of a different size. In such cases, it may be necessary to rearrange other modules in the rack to accommodate the larger or smaller module. Extensive cable connections may have to be detached from the modules and then reconnected to the modules in their new configuration. Of course, such procedures are performed manually and are prone to connection errors, thereby increasing downtime and decreasing reliability of the network.

Many networks use fiber optic technology for high-speed data communication between components in a network. Fiber optic cable typically includes at least one glass core for optical, high bandwidth transmission of information. Typically, fiber optic cable requires a minimum bend radius (e.g., a one-inch bend radius) to avoid damaging the glass core and to avoid producing a signal loss in the transmission of information through the cable.

Provision for high-density fiber optic systems has become more necessary as the use of fiber optic cables has increased. The term "density" as used herein refers to the number of locations per unit volume or unit area for providing connections between fiber optic cables on the chassis. One problem associated with high-density fiber optic cable systems is the need to avoid bending the cables in excess of their minimum bend radius. In addition, the high density creates a need for an organizational system that provides convenient access to modules that need to be removed, replaced, or otherwise accessed.

Another problem that arises with a disorganized, tangled array of cables is that the weight of a mass of cables can stress connections to the computer modules. In some cases, the cables can be bent to an extent that violates the minimum required bend radius. In extreme cases, some of the fibers in the cable can be broken, resulting in complete loss of communication through the connection.

SUMMARY

In some embodiments, a cable management system includes a first cable guide with a cable slot on a platform. A cover is provided that can be positioned over at least a portion of the cable slot. A curved guide member on the platform helps prevent a cable from being bent past an allowable bend radius.

In other embodiments, a cable management apparatus is provided that includes a frame that can be attached to an equipment rack. Cable guides can be mounted on the frame to align a plurality of cables adjacent to each other. A cable tray is positioned adjacent the cable guides. The combination of the frame, the cable guides, and the cable tray can be positioned along a side of a component in the equipment rack. The cable guides and cable tray route the cables around an outer edge of the component.

In still other embodiments, a method for managing cables attached to a component includes attaching a frame with first cable guides around the periphery of a side of the component. Cables are routed around the edge of the component, with one end of each cable being attached to the component, and the remaining portion of the cables is positioned through a cable guides and routed to a second cable guide adjacent the edge of a cable tray.

In additional embodiments, an apparatus for managing cables attached to a component includes means for positioning a first cable guide and a cable tray along one side of the component; means for retaining the cables through the first cable guide, and means for retaining the cables at the edge of the cable tray, thereby routing the cables along the side of the component.

BRIEF DESCRIPTION OF THE FIGURES

Embodiments of the invention relating to both structure and method of operation may best be understood by referring to the following description and accompanying drawings:

FIGS. 3A through 3D show perspective, top, and side views of an embodiment of cable guides in an attachable cartridge that can be used in the cable management system of FIG. 1;

DETAILED DESCRIPTION OF THE EMBODIMENTS

Figure 1:
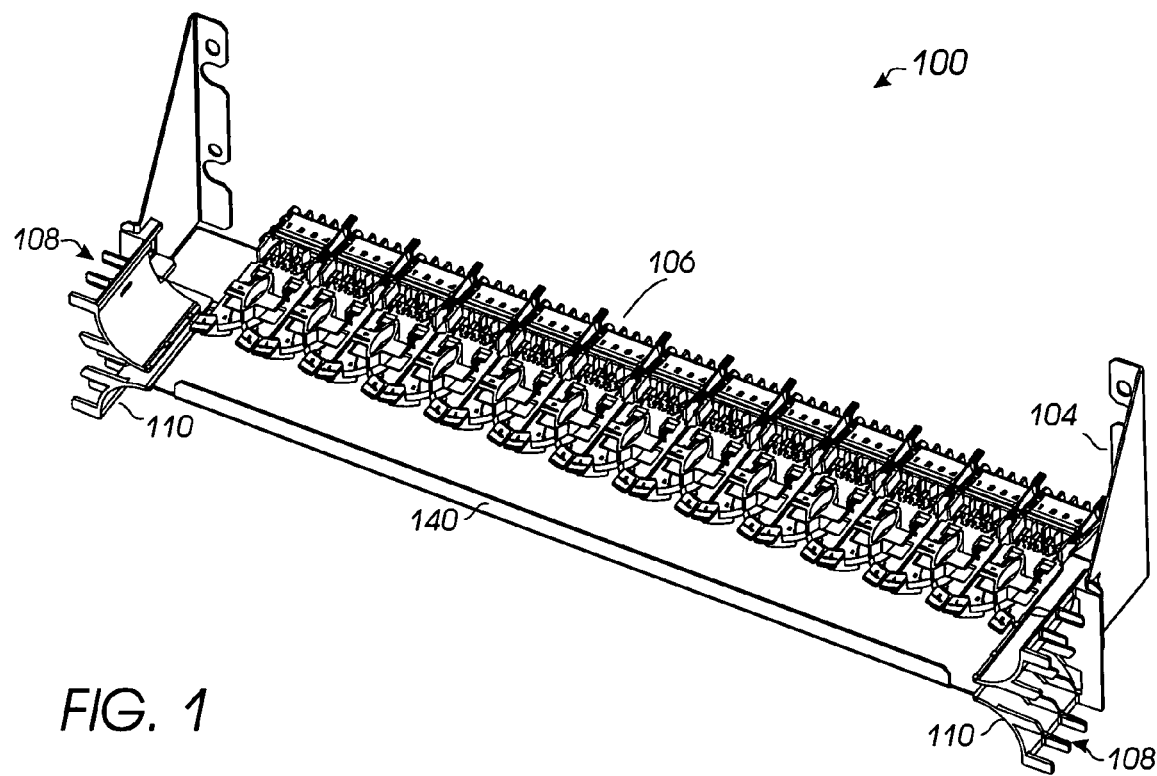
FIG. 1 is a perspective view of an embodiment of a cable management system.

Referring to FIG. 1, an embodiment of a cable management system 100 is shown that allows access to components with out disturbing connections to adjacent component assemblies or connections. Additionally, cables can be routed using cable management system 100 without violating allowable cable bend radii, and without placing strain at the connections of other cables. Embodiments of cable management system 100 fit within existing space around components, and are easily removed and re-installed to rapidly reconfigure a rack of equipment.

The embodiment of cable management system 100 shown in FIG. 1 includes frame 104 on which one or more cable guides 106 can be mounted. Cable management system 100 can also be configured with one or more of a second type of cable guide 108 that routes cables to and from components in the equipment rack. When fiber optic cables are utilized, cable guides 106, 108 can be configured with curved side portions 110 that support the cables without allowing the cables to bend past their allowable bend radius.

Figure 2:
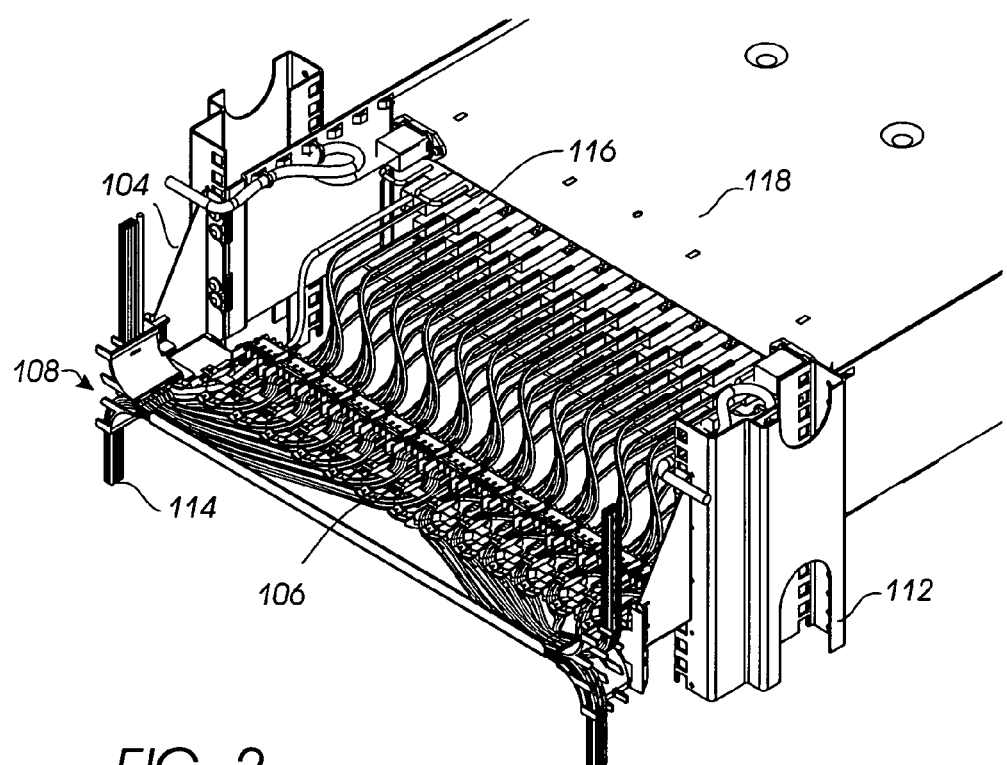
FIG. 2 is a perspective view of the cable management system of FIG. 1 mounted on an equipment rack with cables connected to components via the cable management system.
Figure 4A:
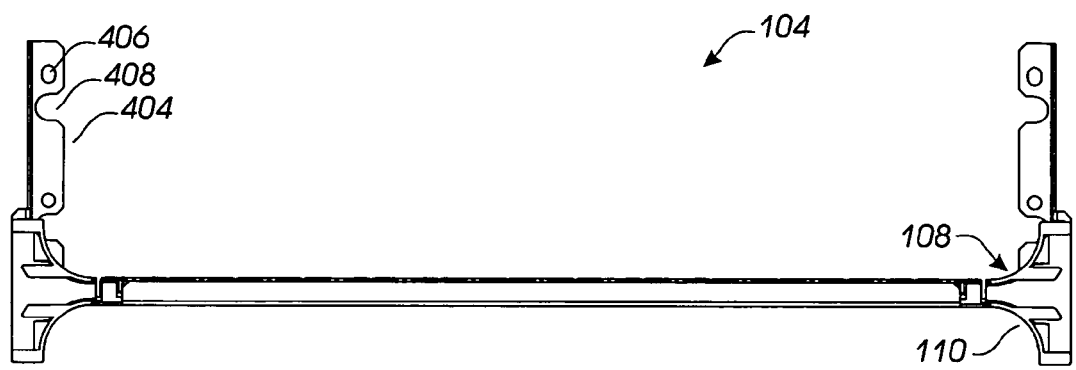
FIGS. 4A and 4B show front and top views of an embodiment of a frame that can be utilized in the cable management system of FIG. 1.
Figure 4B:
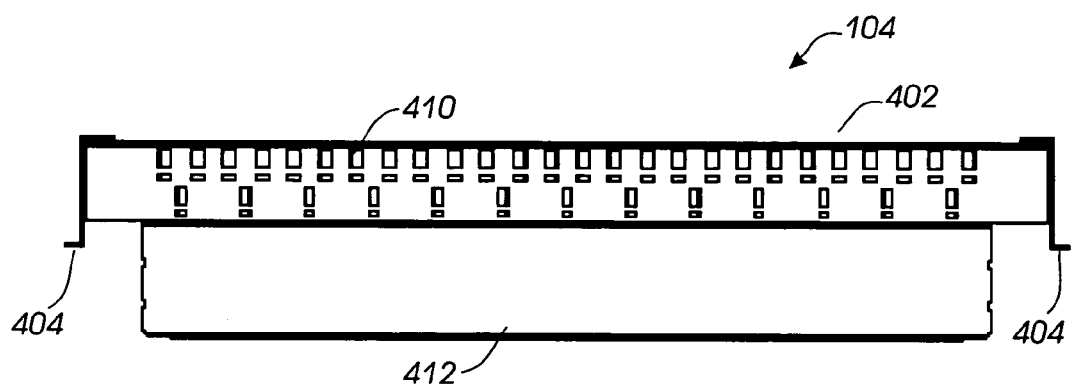

FIG. 2 shows a perspective view of cable management system 100 installed on equipment rack 112. Cables 114 are also shown extending from ports 116 of component 118, through first set of cable guides 106 and second set of cable guides 108. Cable management system 100 is configured to retain cables in a manner that allows free access to other components in equipment rack 112, including the component to which cables 114 are attached, as further described herein.

Cables 114 can be routed through cable management system 100 in different directions, such as to one side or another. FIG. 2 shows cable management system 100 oriented horizontally, with cables 114 routed to the left and right through cable guides 106, and then upward or downward through cable guides 108 along the side of rack 112. In other embodiments, cable management system 100 can be oriented differently, depending on the orientation of components 118 in rack 112. For example, cable management system 100 can be oriented vertically, with cables 114 routed upward or downward through cable guides 106 around the outer edges of components 118.

In some embodiments, cable guides 106 can be formed as integral components of frame 104. The size of frame 104 and the number of cable guides 106 provided can be adapted to the number of cables that will be connected to components in equipment rack 112.

Referring to FIGS. 2 and 3A–3D, an embodiment of cable retaining cartridge 300 is shown that can be utilized as one of cable guides 106. In the embodiment shown, cartridge 300 includes platform 302 configured with guideposts 304 adjacent two sides of cable slot 306. Cover 308 is attached to a portion of cartridge 300 in a manner that allows cover 308 to move between open and closed positions over at least a portion of cable slot 306. In the embodiment shown, cover 308 is hinged to one side of cartridge 300, however, any suitable mechanism for movably mounting cover 308 on cartridge 300 can be utilized.

In the embodiment shown, three guideposts 304 extend from platform 302 in spaced relationship to one another on both sides of cable slot 306, for a total of six guideposts 304. Additional, or fewer, guideposts 304 can be included in other embodiments. Outer walls 310 extend from the edges of platform 302 adjacent guideposts 304 and cable slot 306. The space between guideposts 304 and outer walls 310 form a plurality of channels 312 through which cables 114 can be routed. The distance between guideposts 304, as well as between guideposts 304 and outer walls 310, is selected to accommodate the width of at least one of the cables 114 that will be routed to component 118. In some embodiments, one cable 114 is positioned in each channel 312, while in other embodiments, more than one cable 114 can be positioned in each channel 312.

In some situations, it is desirable to firmly retain cables 114 in cartridge 300 to prevent straining the connection of cables 114 at ports 116. Cover 308 can be configured to place pressure on cables 114 when cover 308 is closed, thereby adding retention force to help prevent stress on cables 114 at ports 116. It is also desirable to avoid pinching or otherwise deforming cables 114 when cover 308 is closed. For example, crimping a fiber optic cable can result in distorted light signals and attendant errors in data transmission. Accordingly, in some embodiments, cushion material 314 can be included in cable slot 306 to help retain cables 114 without pinching or otherwise deforming cables 114. Cushion material 314 can be flexible enough to deform to the shape of cables 114, yet exert sufficient pressure to help retain cables 114 in cartridge 300.

Cartridge 300 can also be configured with a suitable mechanism for retaining cover 308 is closed position to further help retain cables 114. In the embodiment shown, cartridge 300 includes latch 316 formed by an opening in cover 308 that engages a notched portion of outer wall 310 when cover 308 is moved to the closed position over cable slot 306. It is anticipated that other suitable latching mechanisms can be utilized to retain cover 308 in closed position, such as snaps, hooks, and slidable levers.

Additional components can be included with cartridge 300 to facilitate routing cables 114. In the embodiment shown, guide member 318 is positioned at an intermediate location between the edges of platform 302 and is configured with curved portions that provide routing support for cables 114. In some embodiments, the curved portions of guide member 318 can be configured to prevent fiber optic cables from bending past an allowable bend radius. For example, if cables 114 have an allowable bend radius of 25 millimeters, the radius of curvature of relevant portions of guide member 318 can be greater than, or at least equal to, the required 25 millimeters. Cartridge 300 can be labeled to indicate the bend radius of the curved portion(s) of guide member 318.

Curved portions of guide member 318 can also be configured to allow cables 114 to be routed in one of at least two directions. In the embodiment shown, guide member 318 is configured with two curved side portions to maintain the allowable bend radius for routing cables 114 in either one of two directions. Cartridge 300 can include labels or other markings that indicate routing directions, such as the left (L) and right (R) labels shown. As shown in FIG. 2, cables 114 on one side of cable management system 100 are typically routed toward one direction, while cables 114 on the other side of cable management system 100 are routed in the other direction.

Referring again to FIGS. 3A–3D, one or more retaining mechanisms, such as tabs 320, can be provided to help retain cables 114 in desired position relative to guide member 318. Tabs 320 as shown are configured to retain cables 114 adjacent platform 302. Other suitable configurations for such a retaining mechanism, including movable structures, can be included on cartridge 300 to help retain cables 114 adjacent guide member 318 as well as platform 302.

Guide members 322, 324 can be included on cartridge 300, in addition to or instead of, guide member 318. As shown, guide members 322, 324 can be positioned on opposite sides of platform 302 to facilitate routing cables 114 in either direction. Additionally, guide members 322, 324 can include curved portions to maintain the allowable bend radius for cables 114 along their route. Tabs 326, 328 can be provided on guide members 322, 324 to help align and retain cables 114 adjacent guide members 322, 324.

Referring now to FIGS. 1, 2, 3D, 4A, and 4B, FIGS. 4A and 4B show front and top views, respectively, of an embodiment of frame 104 that includes mounting area 402 for cable guides 106, such as one or more cartridges 300. The embodiment of frame 104 shown is configured in a U-shape with attachment members 404 that are positioned to enable frame 104 to be attached to equipment rack 112 (FIG. 2). Equipment rack 112 typically includes side rails with a series of openings that are available for mounting components in rack 112. Attachment members 404 for frame 104 can be adapted to use the same series of openings to attach frame 104 to rack 112. In the embodiment shown, attachment members 404 include apertures 406 for mounting frame 104 to rack 112 with fasteners such as nuts and bolts. Other suitable fastening mechanisms can be utilized. Attachment members 404 can also be configured with cutouts 408 so that attachment members 404 do not interfere with removing or inserting fasteners to mount and dismount components 118 from rack 112.

Mounting area 402 is shown in the center portion of frame 104, with attachment members 404 on either end of mounting area 402. Components of frame 104 can be configured in other suitable shapes and orientations, however, and one or more attachment members 404 can be located in any suitable location in other embodiments of frame 104.

In some embodiments, cable guides 106 can be fabricated as integral components of cable management system 100. In other embodiments, frame 104 can be configured with suitable structure for retaining one or more removable cable guides 106, such as cartridge 300. In the example shown, frame 104 includes a plurality of slots 410 (FIG. 4B) that engage one or more tabs 330 (FIG. 3D) on cartridge 300. The embodiment of frame 104 shown includes thirteen sets of slots 410, with three slots 410 for each of thirteen cartridges 300. Each set of slots 410 is arranged in a triangular pattern. Cartridges 300 can be attached to frame 104 by placing tabs 330 in corresponding slots 410, and sliding cartridge 300 to engage an edge of each slot 410 between a corresponding tab 330 and platform 302. The motion can be reversed to remove cartridge 300 from frame 104. Other suitable means for attaching cartridge 300 to frame 104 can be used.

Frame 104 can further include cable tray 412 for supporting cables 114 along their route and to ensure that any slack in the length of cables 114 does not interfere with access to other components in rack 112. Cable tray 412 is shown adjacent mounting area 402, and can include lip 140 (FIG. 1) to help prevent cables 114 from hanging over the edge of cable tray 412.

Figure 5A:
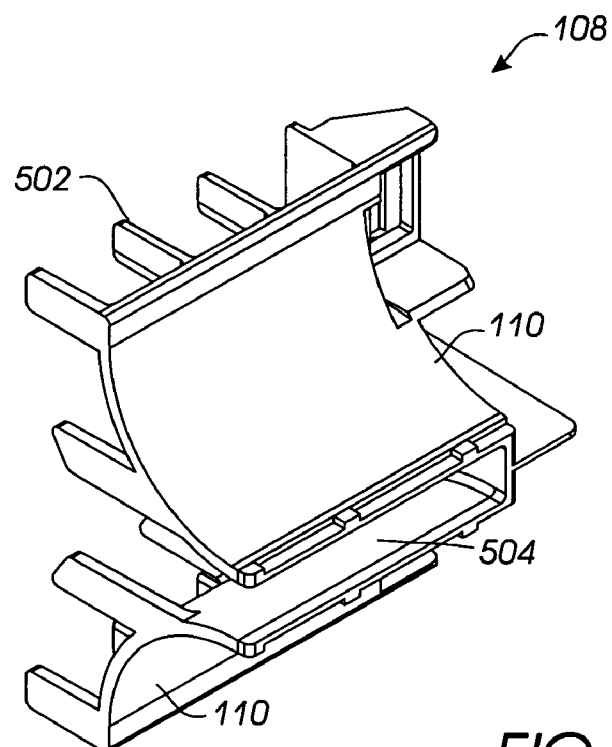
FIGS. 5A and 5B show front and back perspective views of an embodiment of another cable guide that can be utilized in the cable management system of FIG. 1.
Figure 5B:
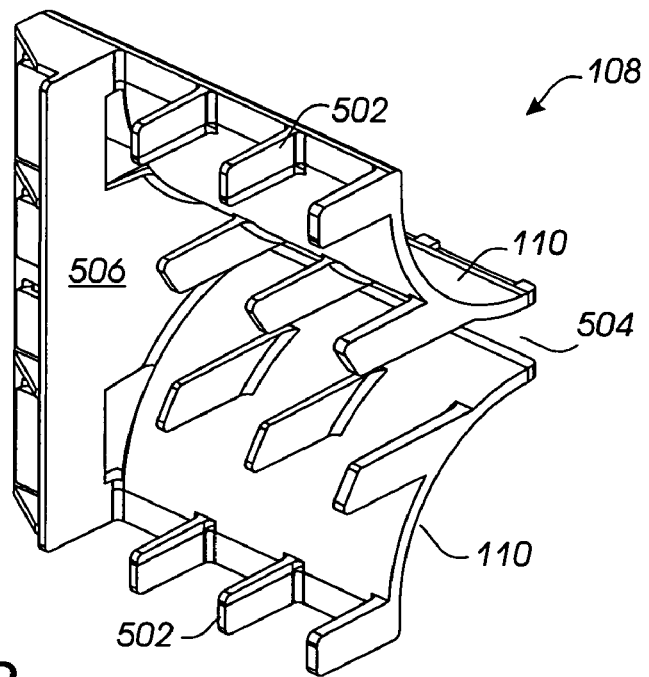

Referring now to FIGS. 2, 5A and 5B, frame 104 can be configured with additional cable guides 108 to facilitate routing cables 114 in different directions along the edge of rack 112. Cable guides 108 can be provided in any suitable position around cable management system 100 for such purpose, including being attachable directly to rack 112 or frame 104, as well as being integrally formed with frame 104. In the embodiment shown, cable guides 108 are attachable to the ends of cable tray 412 (FIG. 4B) by engaging slot 504 at the end portion of cable tray 412. One side portion of cable guide 108 is open to allow slot 504 to be positioned on cable tray 412. Another side portion 506 of cable guide 108 is substantially closed and oriented to prevent cables 114 from falling out of cable guide 108.

In some embodiments, cable guides 108 can include retaining members 502 to help separate groups of cables 114 and to retain cables 114 around the outer edges of components in equipment rack 112. Retaining members 502 are shown attached to curved portions 110 of cable guide 108 as spaced apart rows of finger-like members. Curved portions 110 are attached on one edge to side portion 506, with slot 504 configured between curved portions 110. The radius of curved portions 110 can be greater than or equal to the allowable bend radius of cables 114, as required. Cables 114 can be routed along one curved portion 110 or the other, depending on the routing destination for particular cables 114.

Figure 6:
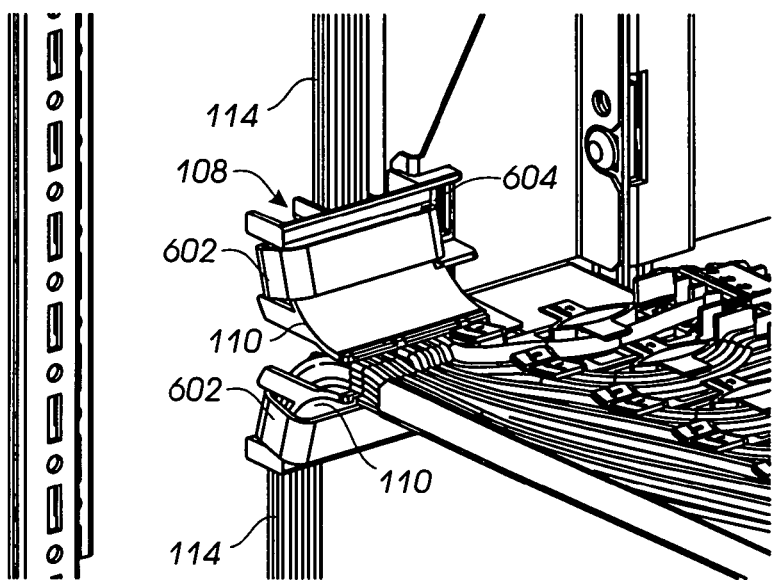
FIG. 6 shows a partial expanded view of the cable management system of FIG. 1 with additional straps for retaining cables on a guide member.

FIG. 6 shows another embodiment of cable management system 100 with a retaining mechanism, shown as straps 602, around curved portions 110 to hold cables 114 firmly against guide member 108. Straps 602 also provide strain relief while maintaining proper bend radius for cables 114. In some embodiments, the width of straps 602 fits through slots 604 on guide member 108 and can be fastened with Velcro™. Other suitable fastening/retaining mechanisms can be utilized, such as cable ties, a retaining bar or cover, similar to cover 308 (FIG. 3B), that is closable around cables 114 to hold cables 114 in place relative to guide members 108.

Figure 7:
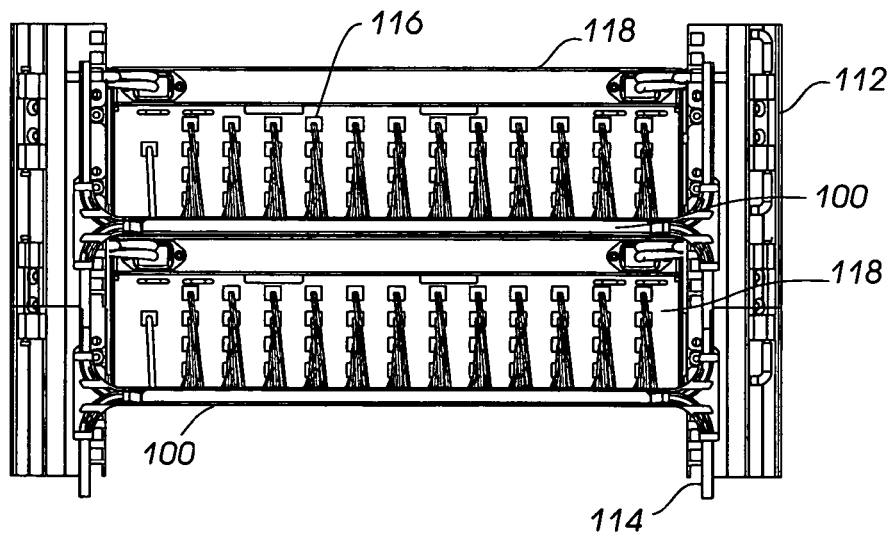
FIG. 7 shows a front view of the cable management system of FIG. 1 installed between components in an equipment rack.

Referring now to FIG. 7, a front view of cable management system 100 installed between components 118 illustrates that cable management system 100 can be configured to use a relatively small amount of space between components 118 in equipment rack 112. Additionally, cable management system 100 enables cables 114 to be efficiently organized and routed around the periphery of components 118 to allow complete access to connection ports 116, as well as to service, remove, and install components 118.

Referring to FIGS. 2 and 7, cable guides 106 can be aligned directly with rows of connection ports 116 to eliminate crisscrossing cables 114. Aligning cable guides 106 with connection ports 116 also allows particular cables 114 to be removed and replaced without disturbing other cables 114. The number of cables guides 106 provided with cable management system can be scaled to the number of connection ports 116 and corresponding cables required to communicate with component 118. Cable management systems 100 can be positioned adjacent any side of components 118 at different orientations, whether between components 118, or between components 118 and rack 112. More than one cable management system 100 can be used to manage cables 114 for a particular component 118.

Cable management system 100 can be used to organize cables for a variety of different types of components 118 such as computer processing systems and any other type of equipment that requires one or more connections to flexible strands of material such as cables, wires, cords, hoses, conduits, and/or flexible pipes. Cable guides 106 can be configured for one type of cable, or for a mixture of several different types and sizes of cable, as well as different allowable bend radii. Cable management system 100 can also be configured with materials that help shield adjacent cables from interference from other cables, such as electromagnetic interference.

Cable management system 100 can be readily detached from rack 112 by disconnecting cables 114 from connection ports 116, and unfastening attachment members 104 from rack 112. Cables 114 can remain organized in cable guides 106 and 108 while components are rearranged in rack 112. Cable management system 100 can then be re-attached to rack 112 in the same, or a different location, and the connections with ports 116 re-established.

While the invention has been described with reference to various embodiments, it will be understood that these embodiments are illustrative and that the scope of the invention is not limited to them. Many variations, modifications, additions, and improvements of the embodiments described are possible. For example, those having ordinary skill in the art will readily implement the steps necessary to provide the structures and methods disclosed herein, and will understand that the components and their arrangement are given by way of example only. The configurations can be varied to achieve the desired structure as well as modifications, which are within the scope of the invention. Variations and modifications of the embodiments disclosed herein may be made based on the description set forth herein, without departing from the scope of the invention as set forth in the following claims. In the claims, unless otherwise indicated the article "a" is to refer to "one or more than one".

We claim:

1. A cable management system comprising:
    a first cable guide including:
        a platform;
        a cable slot on the platform;
        a cover closable over at least a portion of the cable slot; and
        a curved guide member on the platform, wherein the curved guide member is configured to prevent a cable from being bent past an allowable bend radius, wherein the first cable guide is labeled to indicate the bend radius of the curved guide member.

2. The system of claim 1 wherein the first cable guide further includes a guidepost adjacent the cable slot.

3. The system of claim 1 further comprising cushion material in the cable slot.

4. The system of claim 1 wherein the first cable guide includes a latch to retain the cover in closed position over the cable slot.

5. The system of claim 1 wherein one portion of the cover is hinged to the first cable guide.

6. The system of claim 1 wherein the first cable guide is labeled to indicate cable routing direction.

7. The system of claim 1 further comprising a retaining tab coupled to the curved guide member, wherein the tab is configured to retain the cable in place in at least one direction.

8. The system of claim 1, wherein the curved guide member allows the cable to be routed in one of either two directions.

9. The system of claim 1, wherein the first cable guide further includes a second guide member with a curved portion on the platform, and the curved portion of the second guide member is configured to prevent a cable from bending past the allowable bend radius.

10. The system of claim 1 further comprising:
    a frame including at least one mounting area for attaching the first cable guide to the frame.

11. The system of claim 10, wherein the first cable guide is configured with a tab and mounted to the frame by engaging the tab in a slot on the frame.

12. The system of claim 10, wherein the frame further comprises a cable tray adjacent the at least one mounting area.

13. The system of claim 10, wherein the frame includes at least one attachment member configured to attach the frame to an equipment rack.

14. The system of claim 10, wherein the combination of the frame with the first cable guide attached is configured to fit in a space between components in an equipment rack.

15. The system of claim 12, further comprising:
    a second cable guide attached to the cable tray, wherein the second cable guide includes retaining members configured to route the cable around the outer edges of components in an equipment rack.

16. The system of claim 15, wherein the second cable guide includes a curved portion configured to prevent the cable from bending past the allowable bend radius.

17. The system of claim 15, wherein the second cable guide includes a strap to further retain the cable in place relative to the second cable guide.

18. The system of claim 15, wherein the second cable guide attaches to an end of the cable tray and is configured to allow the cables to be routed in one direction or another direction.

19. A cable management apparatus, comprising:
    a frame attachable to an equipment rack;
    a plurality of first cable guides mounted on the frame, wherein the first cable guides are configured to align a plurality of cables adjacent to each other; and
    a cable tray positioned adjacent the first cable guides, wherein the combination of the frame, the first cable guides, and the cable tray is positioned along one side of a component in the equipment rack, and the first cable guides and cable tray are configured to route the cables around an outer edge of the component.

20. The apparatus of claim 19, further comprising:
    a cover positionable to retain the cables in the first cable guides.

21. The apparatus of claim 19, further comprising:
    a second cable guide attached to a side of the cable tray, wherein second cable guide includes a curved portion with a radius greater than or equal to a minimum bend radius for the cables.

22. The apparatus of claim 19, wherein at least a portion of the first cable guides are curved to route the cables to the cable tray without violating a minimum bend radius for the cables.

23. The apparatus of claim 19, wherein the first cable guides are configured to route the cables in either of two directions.

24. The apparatus of claim 19, wherein the first cable guides include markings to indicate routing direction.

25. The apparatus of claim 19, wherein the first cable guides are configured as a plurality of cartridges that are removable from the frame.

26. The apparatus of claim 25, wherein at least one of the cartridges is removable from the frame independently of the other cartridges.

27. The apparatus of claim 25, further comprising a plurality of covers, wherein one portion of each cover is movably attached to a portion of a corresponding cartridge, and another portion of each cover includes a latch to hold the cover in a closed position to retain the cables in position.

28. The system of claim 1, wherein the first cable guide is aligned directly with rows of connection ports of a component installed in an equipment rack to eliminate crisscrossing cables and to allow particular cables to be removed and replaced without disturbing other cables.

29. The system of claim 1, wherein the number of the first cables guides is scaled to the number of connection ports and corresponding cables required to communicate with a component.

30. The system of claim 1, wherein the first cable guide is configured for a mixture of several different types and sizes of cable, and different allowable bend radii.

31. The system of claim 1, wherein the first cable guide is configured with materials that help shield adjacent cables from interference from other cables.

32. The apparatus of claim 19, wherein the cable tray and the frame are configured to allow components to be removed from the equipment rack while the frame is attached to the equipment rack.

33. The apparatus of claim 19, wherein the cable tray is attachable to the frame.

* * * * *